May 7, 1968    R. D. WAPPLER    3,382,353
FIBER OPTIC LIGHT SOURCE
Filed Nov. 30, 1966    2 Sheets-Sheet 2

United States Patent Office 3,382,353
Patented May 7, 1968

3,382,353
FIBER OPTIC LIGHT SOURCE
Reinhold Danforth Wappler, New York, N.Y., assignor to American Cystoscope Makers, Inc., Pelham Manor, N.Y., a corporation of New York
Filed Nov. 30, 1966, Ser. No. 598,071
7 Claims. (Cl. 240—1)

ABSTRACT OF THE DISCLOSURE

A light source unit having two electromagnetic radiant energy sources for delivering radiant energy to a bundle of radiant energy carrying fibers which may be inserted into the unit's outlet. The unit has means for providing relative movement between the energy receiving end of such a bundle and the sources thereby enabling the bundle end to receive and transmit energy from one source or the other as desired.

BACKGROUND OF THE INVENTION

This invention relates to radiant energy sources and more particularly to electromagnetic energy sources which produce radiation in the visible and ultraviolet bands and are generally used with endoscopes for diagnostic and other purposes.

In modern endoscopic procedures, in which still or motion picture photography or color television are used, it is desirable to have a very intense light illuminating the area under consideration. During most such procedures in which photography plays a part, however, there is a period of time during which an examination or operative procedure is conducted under normal lighting conditions. At such a time the intense light necessary for taking color photographs or for color television is unnecessary and in fact impairs good visualization. This excessive brightness hides some of the features which can only be seen under less intense lighting conditions.

Prior light sources which use arc lamps of one type or another provide the intense light necessary for color photography or television but have not been satisfactory. They either produce too much light for the nonphotographic or nontelevision portions of the endoscopic procedures and thus hide features which should be seen, or they include a special device for reducing the illumination of the lamp to a lower level during this period. This latter factor adds to the expense of the unit and lengthens the time during which the lamp is on, thus consuming its life faster than necessary.

SUMMARY OF THE INVENTION

The invention comprises a unit which includes a casing, two different sources of radiant energy within the casing, an outlet in the casing through which this energy may pass, and means for effecting relative movement between the sources and the outlet for selecting and controlling the nature and intensity of the energy from such sources impinging upon said outlet. Preferably, the radiation from each of these sources does not have identical characteristics. One source is preferably a tungsten filament lamp and the other an arc lamp. The filament lamp generates primarily white light and the arc lamp can be of a type which also generates primarily white light or it can be of a type generating a substantial amount of ultraviolet light. Each source or lamp is preferably fitted with an elliptical reflector for focusing the light from the lamp onto the light receiving end of a bundle of light carrying fibers which transmit the light to the endoscope or any other instrument as desired. The reflector associated with each lamp preferably includes a layer of dichroic material to filter out or cut down the amount of infrared radiation or radiant heat transmitted to the outlet and bundle end. The two lamps are preferably mounted side by side in the unit, and the end of the light carrying fiber bundle with which the unit is used is mounted in a light outlet connector at the front of the unit. This connector positions the bundle end at the second focus of the reflector behind one lamp or at the second focus of the reflector behind the other, or at any desired position in between. A grip is provided around the bundle end so it can be easily located as desired. This means that the doctor can move the bundle so that only a part of its light receiving end lies at the second focus of a particular lamp and part of it does not. By moving the bundle end into or out of the focus of either lamp, the doctor can control the amount of illumination received and carried by the bundle. It should also be noted that this illumination intensity control is achieved independently of the color temperature of the light because the lamp light output remains unchanged. This is an important consideration when making internal body examinations because a change in the color temperature of the light can lead to an erroneous diagnosis during an examination.

The unit is also preferably provided with a separate power supply for each lamp and appropriate on-off power switches so that one of the lamps may be turned off when it is not being used. This is of particular benefit because in normal clinical experience light from the tugnsten lamp is entirely adequate most of the time. Generally it is only after many hours of routine use of the unit that pathological conditions are seen of which photographs or a television picture are desired. When such a time comes, however, it is very useful to be able to switch on the arc lamp, attach a camera and take the required photographs.

Various kinds of arc lamps are usable for photographic and television purposes. For example, an iridium-neon-argon lamp is particularly useful in certain cases because its arc is so small that the image produced by its elliptical reflector can be made smaller than the input face of certain commonly available light carrying bundles. A xenon arc lamp has this same feature which is advantageous because it enables substantially higher levels of illumniation to be achieved since more of the lamp's light output can be concentrated on a smaller number of light carrying fibers in the bundle. Iridium lamps are expensive, however, and have the additional characteristic that the intensity of its light output decreases monotonically with time. Thus, turning the lamp off whenever it is not needed conserves not only its life, but the intensity of its light output as well.

A lamp such as a mercury arc lamp is preferred, however, when the unit is to be used in connection with fluorescent endoscopic procedures. In the past, the bluish white and ultraviolet radiation generated by mercury arc lamps has been used to excite fluorescent agents which have become localized in certain areas of tissues exposed to the light. With prior units having such a lamp as their only light source, however, the standard practice has been to visualize the areas under consideration under the natural light from the lamp filtered only by the light carrying fibers in the bundle. Then filters have been moved into place to exclude the white light for a good view of the fluorescent excitation. This practice is undesirable, however, because the color temperature of mercury arc light is so different from tungsten filament light (which is commonly used in making open and internal medical examinations) that the area being viewed appears significantly different thereby increasing the possibility of erroneous diagnosis. With the present invention tungsten filament light can be used for normal visualization with the capability of switching to mercury arc light for fluorescent excitation purposes whenever desired.

Though not shown in the drawings, the invention also comprehends the use of a permanent filter between the filament lamp and the light outlet. This filter takes out or cuts down the transmission of certain wavelengths of light from the lamp to achieve a better color balance in the light emanating from the distal end of the fiber bundle. Ordinary naked filament light, for example, has a color temperature in the neighborhood of 3200° K., but the fibers in the bundle filter out some of the blue light causing the color temperature of the light to drop to about 2600° K. at the distal end of the bundle. By using the suggested permanent filter, the color temperature of filament light at this end of the bundle can be brought back to about 3200° K.

When a mercury arc lamp is used for fluorescent endoscopic procedures, it may also be desirable to provide a permanent filter between that lamp and the outlet. The purpose of the filter is to reduce or eliminate the portion of the lamp's radiation that is not wanted. In fluorescent endoscopy the patient is treated with one or more fluorescent agents which become localized in abnormal tissue cells or in the connective tissue surrounding those cells. Each agent is excited best by radiation of a particular wavelength, and in response to that radiation it gives off its own visible radiation of a lower frequency. The purpose of the permanent filter is to cut out the lower frequency radiation of the arc lamp so the light emanating from the distal end of the bundle will not hide or make the fluorescing tissue more difficult to see. Any other arc lamp having an adequate bluish white and ultraviolet light output can be used for fluorescent endoscopic procedures in place of a mercury arc lamp and if used may be permanently filtered in a similar manner.

BRIEF DESCRIPTION OF THE DRAWINGS

Referring now to the drawings.

DESCRIPTION OF THE PREFERRED EMBODIMENT

Figure 1:
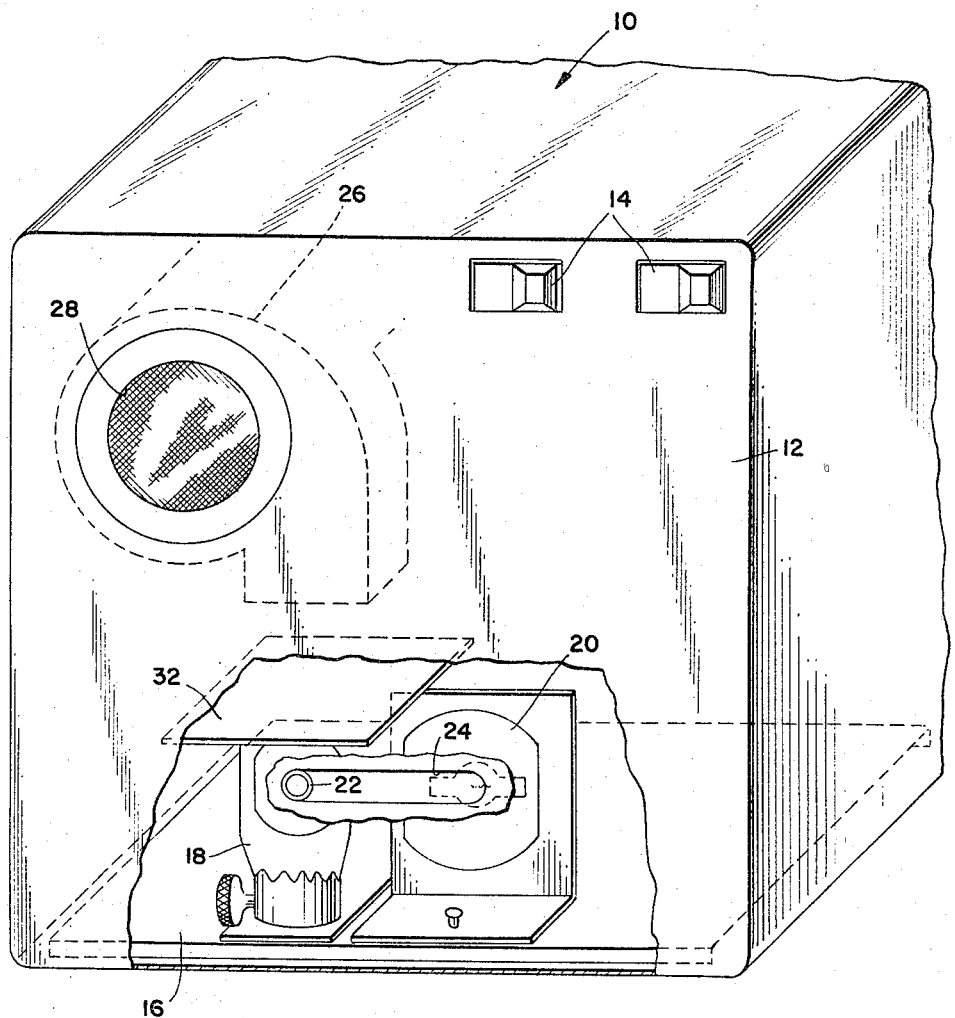
FIG. 1 is a partial isometric view of the preferred embodiment of the invention partially cut away to show the location of the lamps and the fiber bundle connector relative to them.
Figure 2:
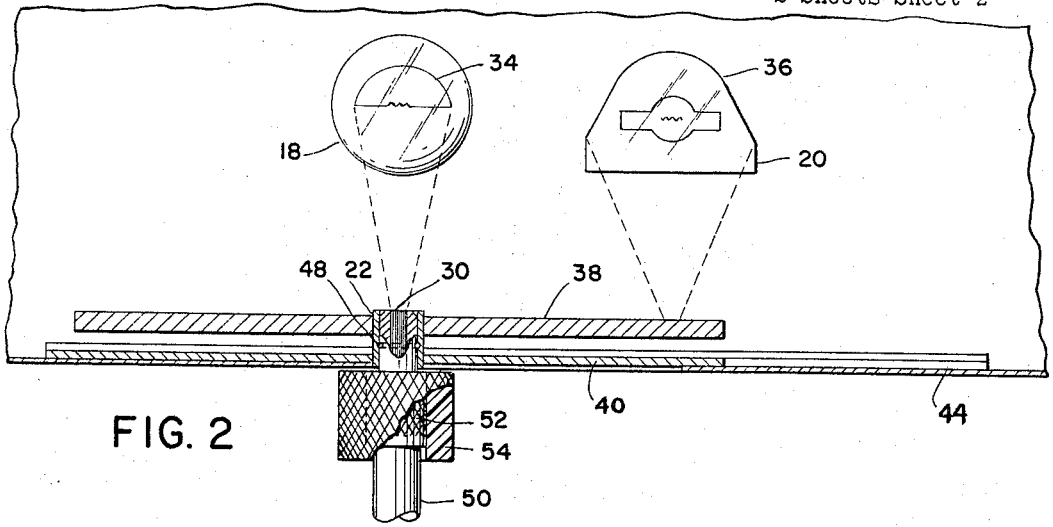
FIG. 2 is a plan view in cross section of the apparatus of FIG. 1 showing the details of the connector and illustrating the lamps schematically.

Referring now more particularly to FIG. 1, the apparatus according to the preferred embodiment of the invention includes a casing 10 having a front face 12 in which are mounted a pair of on-off switches 14 for controlling the energization and de-energization of the lamps within the casing. Inside the casing is a support frame 16 on which is mounted a tungsten filament lamp 18 and an arc lamp 20 side-by-side to each other. A connector 22 is movably mounted in a slideway 24 in front face 12 for purposes which will be hereinafter described in more detail. Above the lamps a cooling system including a blower 26 is mounted to pull air through an opening 28 in face 12. The blower drives cool air downwardly to cool the connector 22 and the light receiving end 30 of a bundle of light transmitting fibers 50 as shown in FIG. 2. A baffle plate 32 is preferably mounted between the blower and the lamps to protect the latter from direct blasts of cooling air while keeping the fiber bundle end 30 as cool as possible. When lamp 20 is a mercury arc lamp, a housing (not shown) should be built around it to ensure that no harmful cool air blasts hit the lamp envelope. Separate power supplies (not shown) are provided within the casing for each lamp and the lamps may be operated continuously or in pulses as desired. Other electrical elements such as rheostats or variable transformers and the like may also be housed within the casing. The unit can be made to operate on almost any available electrical power.

Figure 4:
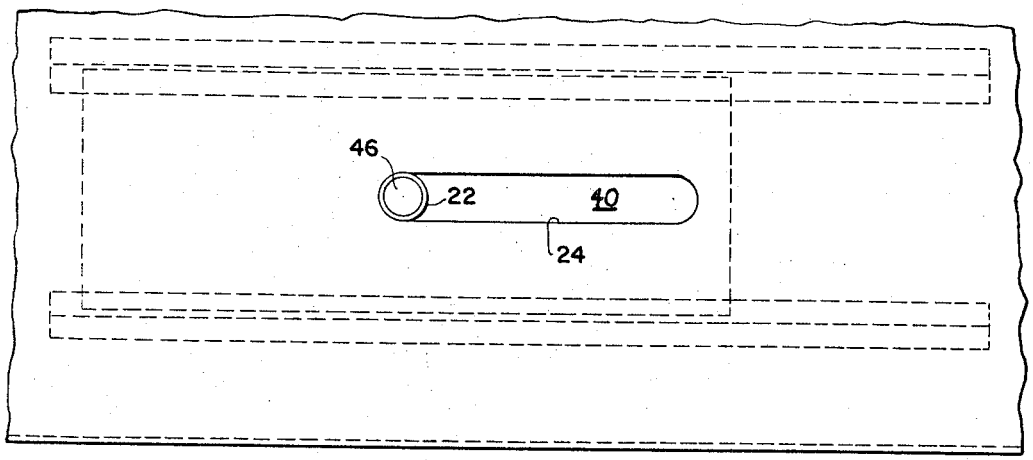
FIG. 4 is a profile cross sectional view of the apparatus of FIGS. 2 and 3 giving additional details of the slide construction.
Figure 3:
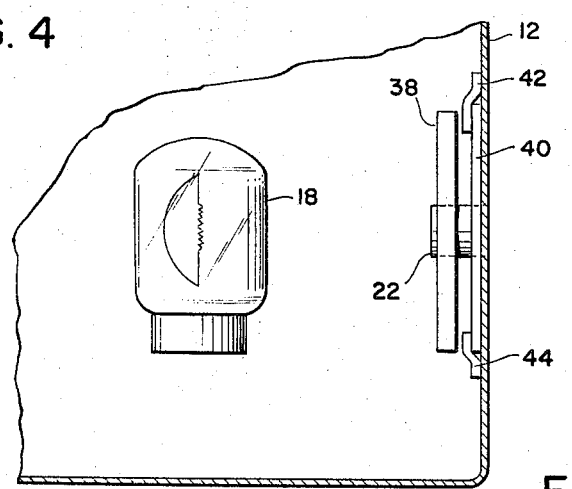
FIG. 3 is a front view of the apparatus of FIG. 2 showing the slideway in which the connector is moved.

Referring now more particularly to FIGS. 2, 3 and 4, lamp 18 is preferably provided with an elliptical reflector 34 and lamp 20 with a similar reflector 36. The filament in lamp 18 is located at the first focus of reflector 34 and the lamp is positioned so that the bundle end 30 lies at the second focus of the reflector when connector 22 is at the extreme left position of slideway 24 as seen in FIG. 2 by the dotted lines. The arc of lamp 20 is similarly located at the first focus of reflector 36 and bundle end 30 lies at the second focus of reflector 36 when connector 22 is at the extreme right hand end of the slideway as suggested by another pair of dotted lines in FIG. 2. A light baffle plate 38 is mounted around connector 22 to prevent light from either one of the bulbs from escaping through the opening formed by slideway 24, and also to act as a heat sink and cooling fin to help maintain the connector and bundle end as cool as possible. Additional fins for this purpose may be mounted on the connector as desired. Each such fin absorbs heat from the connector and transmits it to the cooling air from blower 26. Baffle plate 32 does not hinder the passage of air past these cooling fins. Connector 22 is itself mounted in a slider plate 40 which lies against the inner surface of front face 12 and is movable transversely with respect thereto in a channel formed by upper and lower slide support elements 42, 44 respectively. These elements are aligned with the axis of slideway 24 so that as plate 40 is moved the connector is carried within the slideway.

The front of connector 22 extends into slideway 24 and has an opening 46 which is adapted to receive bundle end 30. The inside of the connector may be provided with conventional means 48 for releasably holding the bundle end in the connector. The bundle end 30 forms part of light carrying bundle 50 of optical fibers which is surrounded adjacent its end by a ferrule 52 which may be gripped between the fingers of one hand to insert and remove the bundle from the connector. The heat from the lamps inside the unit is so intense that preferably a Bakelite or other suitable heat insulator collar 54 is mounted around ferrule 52 so that the collar may be gripped when inserting or removing the bundle end from the connector instead of the ferrule which might be too hot to touch.

If bundle 30 is located at the second focus of reflector 34, and collar 54 is then moved slightly to the right in the embodiment of FIG. 2, the bundle end will be moved partially out of the second focus of reflector 34. This reduces the intensity of light impinging on the bundle end thereby reducing the amount of light carried by the bundle. Since the output of the lamp remains constant, this change in intensity is accomplished independently of the color temperature of the light. The same control is obtainable with respect to the second focus of reflector 36 and arc lamp 20.

It will be understood that various changes in the details, materials, steps and arrangements of parts, which have been herein described and illustrated in order to explain the nature of the invention, may be made by those skilled in the art within the principle and scope of the invention as expressed in the appended claims.

I claim:

1. A fiber optics source of radiant energy, comprising a casing, two sources of radiant energy mounted within said casing, an outlet in a wall of said casing adapted to receive an end of a radiation transmitting fiber optics device, means for effecting relative movement between said sources and said outlet for selectively positioning said outlet in front of each of said sources, means for concentrating the radiation from one of said sources on said outlet when it is in position in front of said source, and means for concentrating the radiation from said other source on said outlet when it is in position in front of said other source; whereby the amount and intensity of radiant energy from each source impinging upon said outlet may be controlled.

2. A fiber optics source of radiant energy according to claim 1 wherein said two radiant energy sources are mounted side by side, means are provided for concentrating the radiation from one source on said outlet when it is in position in front of said source, means are provided for concentrating the radiation from the other source on said outlet when in position in front of said other source, said outlet comprising a connector in which said end portion of said radiation transmitting fiber optics device is releasable connectable, an aperture in one wall of said casing, and means supporting said connector in said aperture for moving the same from the concentrated radiation of one of said sources to the concentrated radiation of the other.

3. A fiber optics source of radiant energy according to claim 2 comprising a light source unit wherein said one radiant energy source comprises a filament lamp, said other radiant energy source comprises an arc lamp, and said radiation transmitting fiber optics device comprises at least one light transmitting fiber.

4. A light source unit according to claim 3 wherein said arc lamp comprises a mercury arc lamp.

5. A light source unit according to claim 3 wherein said means supporting said connector in said aperture comprises a slider in which said connector is mounted, said slider being movably mounted adjacent one wall of said casing to locate said connector at a desired position in said aperture.

6. A light source unit according to claim 4 wherein said means supporting said connector in said aperture comprises a slider in which said connector is mounted, said slider being movably mounted adjacent one wall of said casing to locate said connector at a desired position in said aperture.

7. A light source unit according to claim 5 wherein means are provided for preventing light from said lamp escaping through said aperture.

References Cited
UNITED STATES PATENTS

| | | | |
|---|---|---|---|
| 2,217,526 | 10/1940 | Pelikan | 350—96 |
| 2,861,537 | 11/1958 | Kadlec | 240—1 |
| 2,914,021 | 11/1959 | Blackwell | 240—1 |

NORTON ANSHER, *Primary Examiner.*

R. A. SCHROEDER, *Assistant Examiner.*